3,344,690
BORING BAR ASSEMBLY
Arthur J. Proksa, Elmwood Park, Ill., assignor to Everede Tool Company, Chicago, Ill., a corporation of Illinois
Filed Sept. 17, 1965, Ser. No. 488,032
6 Claims. (Cl. 77—58)

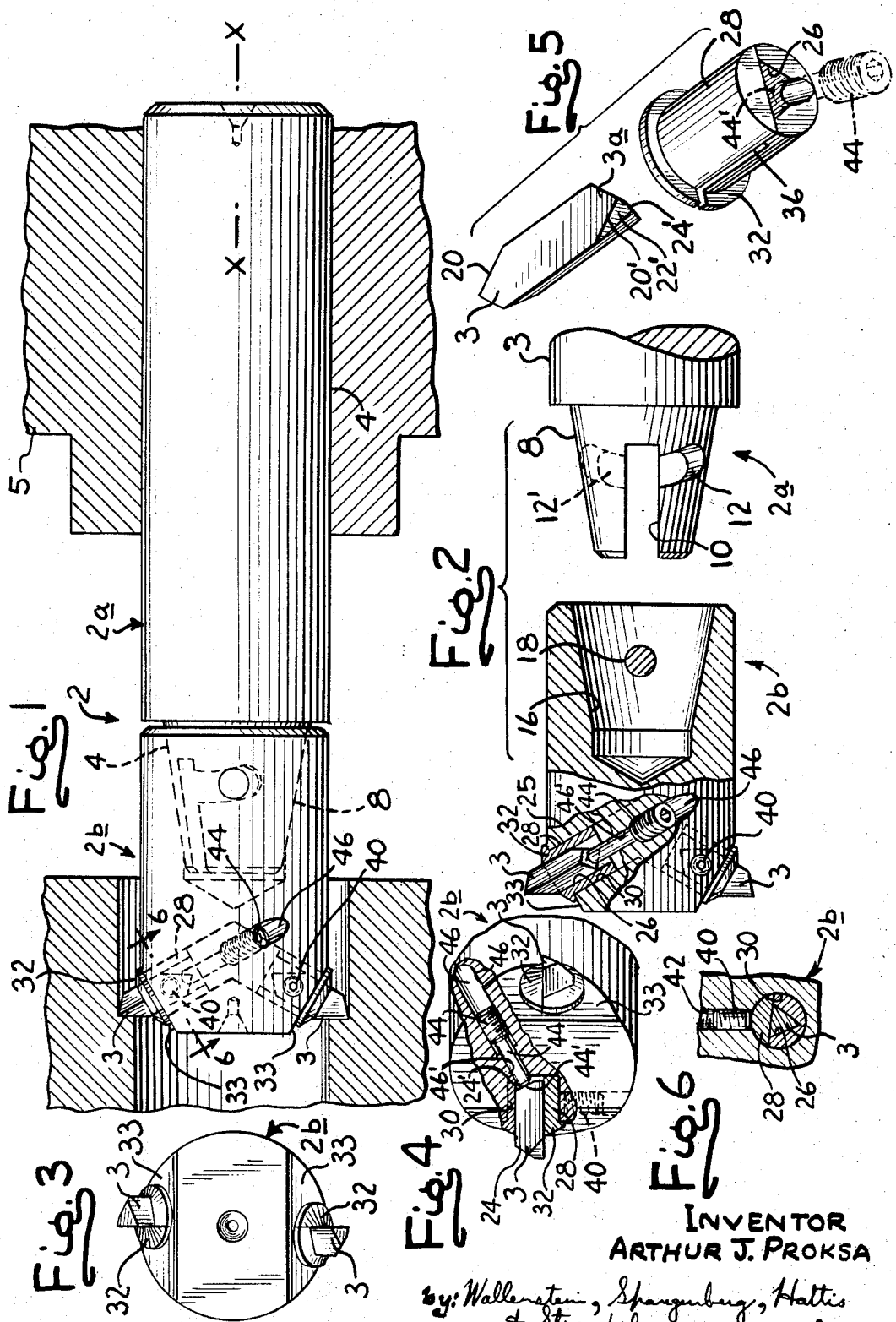

This invention relates to a machine tool apparatus and more particularly it relates to a unique boring bar and tool bit assembly which enables the convenient and accurate adjustment of the size of the holes bored thereby.

A boring bar commonly comprises an elongated tool bit holding member which removably carries one or two tool bits on the outer end thereof made of a special metal cutting material such as tungsten carbide. The inner end of the tool holding member, which will be referred to as a boring bar, is inserted into the jaws of a boring head which fits into the rotatable head of a boring machine or other tool bit rotating machine. Where a single tool bit is inserted in the boring bar, the size of the hole cut by the tool bit is determined by the distance between the axis of rotation of the boring head and the tip of the cutting edge of the tool bit which projects laterally from the outer end of the boring bar. Where the boring bar carries two tool bits (which generally extend from diametrically opposite sides of the outer end of the boring bar), the tool bits are generally carried by floating blocks which automatically establish a diameter determined by the distance between the tips of the cutting edges of the tool bits which is independent of any slight eccentricities between the axis of rotation of the rotating boring head and the longitudinal axis of the boring bar. The degree of eccentricity of the longitudinal axis of the boring bar and the axis of rotation of the boring head varies a little bit each time the boring bar is removed from the boring head for tool bit adjustments and then replaced thereon. Any variation of this eccentricity at the inner end of the elongated boring bar is accentuated at the tool bit holding end thereof by deflection of the boring bar.

Thus, in the case of a boring bar having a single tool bit, it is not convenient or readily possible to adjust accurately the size of the hole which would be cut by the tool bit without using a trial and error approach, as by adjusting and measuring the distance between the axis of the boring bar and the tip of the cutting edge of the tool bit with suitable measuring instruments while the boring bar is removed from the boring machine. Although a boring bar carrying a pair of tool bits supported on floating blocks as explained above poses no such problems, the minimum size limitations of the floating blocks carrying the tool bits limits the minimum size of the holes which can be cut by the tool bits to about one and one half inches in diameter. Also, the tool bits carried by the floating blocks are of such a shape and construction that they are more bulky and expensive than tool bits of other constructions which need not be designed to be carried by floating blocks.

Accordingly, one of the objects of the invention is to provide a unique boring bar assembly having one or more tool bits capable of boring holes of a wide range of sizes, including hole sizes well under one and one half inches in diameter, and whereas the tool bit or tool bits thereof can be replaced by other tool bits or relocated on the boring bar in a manner where the size of the holes bored thereby can be easily predetermined and adjusted without a trial and error method.

Another object of the invention is to provide a boring bar assembly as described wherein the boring bar assembly includes a shank piece which can be left in the rotatable head of a boring machine and a head piece which carries one or more tool bits which can be precisely positioned with respect to the axis of the head piece, and further wherein the head piece is designed so that it can be easily removed from and replaced back onto the shank piece with a precise and consistent concentricity maintained between the head piece and the shank piece.

There are basically two different types of tool bits. In one type, the tool bit comprises a long piece of tungsten carbide or similar metal with a cutting edge at one end. When the cutting edge is worn away, a new cutting edge is cut on the worn end of the tool bit. In another type, the tool bit is a throw-away type comprising a relatively short piece of metal with cutting edges pre-cut on both ends thereof so that when one of the edges has been worn away the tool bit is reversed in position on the boring bar to expose the unused end. Such a tool bit is thrown away when the latter edge is worn away. The throw-away tool bits are exceedingly convenient and result in a substantial reduction in cost to the user thereof.

It is another object of the invention to provide a uniquely shaped and constructed throw-away tool bit which is of smaller size and of simpler construction and therefore less costly than the throw-away tool bits heretofore utilized. A related object of the invention is to provide a unique boring bar for these throw-away type tool bits with means for readily and precisely adjusting the position of the tool bits.

In accordance with one aspect of the invention, the usual single piece boring bar is split up into two separate axially spaced parts, one being a shank piece which occupies most of the length of the overall boring bar assembly. The shank piece has an inner end which is inserted into a rotatable boring head in the usual way. The outer end of the shank piece has a relatively short head piece which removably carries one or two boring tool bits extending laterally from the head piece. Cooperating means are provided on the inner end of the head piece and the outer end of the shank piece for removably interconnecting the same in a manner which insures precise centering of the axes of the head piece and the shank piece and easy manual removal of the head piece from the shank piece.

In accordance with a specific aspect of the invention, this means includes the provision of an outwardly tapered projection on the outer end of the shank piece and a correspondingly shaped tapered socket on the inner end of the head piece. (The location of the socket and projection could be reversed.) The degree of taper of the tapered projection and socket is sufficiently great that the head and shank pieces can be separated by a modest application of manual force and sufficiently small that a precise centering of the two pieces is achieved. For example, in many instances it is desirable that the concentricity of the head and shank pieces be maintained to one ten thousanth of an inch on either side of center. To achieve such a concentricity, the degree of taper cannot exceed 30 degrees and most preferably, should not exceed 20 degrees. (The angle of taper referred to is the included angle between the converging lines on opposite sides of the taper.) To insure easy release of the tapered connection, the minimum taper should not be less than 10 degrees and most preferably not less than 16 degrees.

For angles of taper of 16 degrees and greater, the connection between the tapered surfaces is so loose that the two pieces readily separate without the provision of auxiliary holding means. To this end, the shank and head piece are relatively locked together by an interlocking joint most advantageously comprising a pin extending across the tapered socket and an axial pin-receiving slot provided in the outer end of the tapered projection. The tapered projection has a first laterally extending and inwardly curved and peripherally open cam slot intersecting one side of the axial slot and a second laterally extending and inwardly curved and peripherally open cam slot intersecting the other side of the axial slot to provide diametrically opposed cam slots in which the pin in the tapered socket extends and becomes wedged when the head piece is turned in one direction with respect to the sank piece. The cam slots are designed to permit the ready manual separation of the head and shank pieces.

With the construction of a boring bar assembly as just described, the shank piece can be anchored in position in the boring head of the boring machine to establish a fixed axial frame of reference at the outer end thereof as determined from the size of the holes initially bored by the tool bits of the head piece attached to the shank piece, and replacement of worn out tool bits or adjustment of the positions thereof on the head piece to form a desired sized opening can be made by the simple expedient of removing the head piece and precisely locating the cutting edge of the one or more tool bits carried by the head piece with respect to the axis of the head piece using well known measuring instruments. In the meantime, the boring machine can be in use by placing another previously set-up head piece so that the shutdown time of the machine is minimized. The short distance between the tool bits on the head piece and the tapered connection interconnecting the head and shank pieces minimizes errors in the set-up operation due to the small variance in the deflection occurring between the inner and outer ends of the head piece.

In the preferred form of the invention, the tool bits are of throw-away type where the tool bits have identical cutting edges on the opposite ends thereof. In accordance with another aspect of the invention, each end of the throw-away tool bit is provided with an axially outwardly facing positioning shoulder which is not affected by the wear on the associated cutting edge. The tool bit most advantageously has a triangular transverse cross-section and is adjustably mounted in a laterally extending socket in the head piece. The tool bit preferably fits within the triangular socket of a split sleeve removable quill in turn fitting into the socket in the head piece. The position of the tool bit in the head piece socket is determined by the position of an adjustable locating pin which threads into the head piece and acts as an adjustable abutment shoulder for the axially outwardly facing positioning shoulder at the inner end of the tool bit. The tool bit is clamped in its adjusted position by a clamping screw which compresses the split sleeve quill around the tool bit and pushes the quill solidly against the one side of the socket of the head piece receiving the quill. When the cutting edge at one end of the tool bit is worn, the clamping screw is loosened, the tool bit is reversed in position in the quill socket with the locating pin abutting the positioning shoulder on the end of the tool bit having the worn cutting edge, and the clamping screw is retightened. The tool head is then ready to cut another hole to the precise diameter of the holes previously cut by the tool bit without any further adjustment.

The construction of the tool bit and the head piece just described permits the cutting end of the boring bar assembly to be compactly constructed for boring small size holes well under one and one-half inches in diameter. It is significant also that all of the advantages of the invention referred to above are achieved at a lesser cost than the prior art boring bar equipment.

The various objects, advantages and features of the invention will become apparent upon making reference to the specification to follow, the claims and the drawings wherein:

FIG. 1 is a side elevational view of a boring bar assembly constructed in accordance with the preferred form of the invention, the boring bar being within a boring head shown in section and boring a hole in a work piece also shown in section;

FIG. 2 is a fragmentary exploded view of the parts making up the boring bar assembly of FIG. 1, the head piece portion therof being shown in section and the shank piece portion thereof being shown in elevation;

FIG. 3 is an end elevation of the tool carrying end of the boring bar assembly of FIG. 1;

FIG. 4 is a perspective view, partly broken away, illustrating the manner in which one of the tool bits is precisely positioned in the head piece of the boring bar assembly;

FIG. 5 is an exploded view in perspective of the tool bit and quill assembly forming part of the boring bar assembly of FIG. 1; and FIG. 6 is an enlarged transverse sectional view through the head piece taken along section line 6—6 in FIG. 1 and showing the tool bit and quill in place therein.

Referring now to FIG. 1, the preferred form of boring bar assembly 2 of the invention shown therein comprises a shank piece 2a and a head piece 2b which carries one or more boring tool bits 3 projecting laterally from the outer end of the head piece 2b. For reasons to be explained, the length of the head piece 2b is only a small fraction of the length of the shank piece 2a, such as substantially less than one half of the length thereof as illustrated. The inner end 4 of the shank piece is adapted to fit and be clamped within a boring head 5 which is rotated about an axis $x$—$x$ of a boring machine (not shown). The inner end of the head piece 2b is connected to the outer end of the shank piece 2a by a special joint which permits the head piece 2b readily to be manually removed from the shank piece, and, after replacement or adjustment of the tool bits 3 is repositioned on the outer end of the shank piece 2a without changing the concentricity or relative position of the head piece with respect to the longitudinal axis of the head piece and the axis of rotation $x$—$x$ of the boring head 5.

The outer end of the shank piece 2a has a reduced axially extending and tapering projection 8. The tapered projection 8 has an axial end slot 10 and a pair of circumferentially extending, inwardly curved, peripherally open cam slots 12′–12 intersecting opposite sides of the end slot 10 at diametrically opposite sides of the tapered projection 8. The cam slots 12–12′ are operative in a manner to be described releasably to lock the head piece 2b on the shank piece 2a.

The head piece 2b has a socket 16 at the inner end thereof which has a taper corresponding to the taper of the projection 8 of the shank piece 2a. The tapered projection 8 of the shank piece 2a fits closely within the tapered socket 16 of the head piece, the degree of taper thereof being sufficiently small insure accurate centering of the head piece on the shank piece and sufficiently large to insure the easy separation of the telescoping surfaces thereof. As previously indicated, the degree of taper is preferably between 16 and 20 degrees.

A locking pin 18 extends between the central portion of the tapered socket 16 and is receivable within the axial end slot 10 of the tapered projection 8 of the shank piece 2a. When the defining walls of the tapered socket 16 of the head piece is nearly completely telescoped around the tapered projector 8 of the shank piece, the locking pin 18 is in position to enter the cam slots 12–12′ previously described. Then, upon rotation of the head piece relative to the shank piece in one direction, the locking pin 18 wedges within the cam slots 12–12′ thereby to lock the head piece on the shank piece. The application of a modest twisting force on the head piece in the opposite direction will readily separate the head piece from the shank piece to permit quick removal of the head piece from the shank piece without the use of any tools.

Another aspect of the invention is the design of the tool bits and, the portions of the head piece 2b which receive the tool bits and adjustably lock the same in place.

Each tool bit 3 has a triangular cross-section in a plane at right angles to the longitudinal axis of the tool bit which extends generally laterally of the outer end of the head piece 2b. Each tool bit 3 is of the throw-away type and has substantially identically shaped profiles on opposite ends thereof on opposite sides of the longitudinal axis thereof, so that the shape and orientation of each projecting end of the tool bit will be the same whether one end ends thereof on opposite sides of the longitudinal axis or the other is projecting from the head piece 2b. Each tool bit 3 (FIG. 5) has a flat axially extending surface 3a with a cutting edge 20 or 20' inclining inwardly and outwardly at each end thereof on the opposite sides of the longitudinal axis of the tool bit.

The cutting edge 20 or 20' defines one of the margins of a cut-away portion 22 or 22' defining a primary clearance angle. There is provided at each axial end of the tool bit on the side of the tool bit remote from the aforementioned surface 3a and outwardly axially facing surface 24 or 24' which forms a secondary clearance angle and a positioning shoulder which is spaced from and thus unaffected by the wear on the associated cutting edge 20 or 20'.

Each tool bit 2 is preferably carried within a triangular shaped socket 26 (see FIG. 6) of a split sleeve quill member 28. Each quill member 28 is removably carried within a laterally extending socket 30 in the head piece 2b. Each quill member 28 as illustrated has an outer flange 32 which bears upon a forwardly and outwardly facing shoulder 33 on the end of the head piece. Each quill member is split longitudinally as indicated at 36 to form a split-sleeve construction which enables the associated tool bit 3 to be securely clamped in place by a clamping screw 40 or the like threaded within a bore 42 of the head piece extending to the outside of the head piece. When the clamping screw is tightened, it pushes one side of the sleeve tightly against the tool bit which in turn forces the opposite side of the quill member against the opposite side of the bore 30 to anchor the quill member and the associated tool bit securely in place within the associated socket 30 of the head piece 2b.

The position of each tool bit 3 within each quill member 28 is adjusted by means of a locating screw 44 threaded within a bore 46 extending to the outside surface of the head piece 2b. Each bore 46 has an end portion 46' communicating with the associated quill member socket 30 in the head piece at an angle where the flat end 44' of the locating screw 44 makes facial contact with the positioning shoulder 24 and/or 24' on the associated tool bit 3. The degree to which each tool bit 3 projects laterally from the head piece 2b is determined by the position of the flat end 44' of the locating screw which is adjusted by rotating the locating screw. During this adjustment, the clamping screw 40 associated with the quill member involved is loosened to permit the tool bit 3 to move freely within the bore 26 of the quill member. As previously indicated, the adjustment of the position of the tool bits 3 is made preferably while the head piece 2b is disconnected from the end of the shank piece 2a using suitable well known instruments for measuring the distance between the tip of the cutting edge of each tool bit and the longitudinal axis of the head piece 2b.

It is apparent that the present invention has provided an exceedingly simple, compact, inexpensive and easy to adjust boring bar assembly which materially enhances the boring bar art.

In should be understood that numerous modifications may be made in the preferred form of the invention shown in the drawings without deviating from the broader aspects of the invention.

I claim:

1. A boring bar assembly to be inserted into the rotatable head of a machine for driving the boring bar, said assembly comprising: a shank piece for carrying tool bits only at the outer end thereof and having an inner end for mounting the shank piece in said rotatable head and an outer tool bit carrying end, a relatively short head piece releasably attached only to the endmost surface at the outer end of the shank piece and adjustably supporting a boring tool bit laterally extending therefrom which tool bit is to be accurately adjusted to a proper spacing from the center of the head piece by measuring instruments used on the head piece and tool bit when the head piece is removed from the shank piece, and cooperating means on the inner end of the head piece and the endmost surface of the outer end of the shank piece for removably interconnecting the same along the longitudinal axis of the boring bar assembly and for establishing an accurate concentricity between the head piece and the shank piece, said cooperating means comprising telescoping tapered portions on the head and shank pieces longitudinally tightly fitted together, the degree of taper thereof being at least about 16 degrees so the head piece can be readily removed by manually grasping the head piece and pulling the same from the shank piece and being no greater than about 20 degrees so the head piece is accurately centered on the shank piece, said cooperating means further including an axial end slot extending across the tapered portion of the piece telescoping into the tapered socket of the other piece which end slot opens onto the end of the former piece within the socket, and a transverse pin in the latter piece which pin fits into the end slot, the former piece having a peripherally open, laterally extending and inwardly curved slot intersecting one side of said axial end slot at one side of the piece and a peripherally open, laterally extending and inwardly curved slot intersecting the other side of said axial end slot at the other side of the piece, wherein said lateral slots are diametrically opposed and form channels into which said lateral pin becomes manually separably wedged firmly to hold the head and shank pieces together.

2. The boring bar assembly of claim 1 wherein the distance between the point of connection of said head and shank pieces and the tool bit carried by said piece is a small fraction of the overall length of the boring bar assembly.

3. The boring bar assembly of claim 1 wherein said head piece has a tapered socket and said endmost surfaces of the shank piece is a tapered projection fitting into said socket, and the length of said head piece being only a fraction of the length of the shank piece, wherein there is a relatively short distance between the point of connection of the head piece to the shank piece and the tool bit thereof.

4. A boring bar assembly comprising: a shank piece having an inner end removably mountable in a rotatable head of a machine for driving the boring bar assembly, and a head piece for carrying a boring tool bit, the head piece being short relative to the length of the shank piece and joined thereto through a telescoping tapered joint which provides accurate centering of the head piece on the outer end of the shank piece and is readily manually removable therefrom, a boring tool bit extending laterally from the outer end of said head piece, the tool bit having at opposite ends thereof and on opposite sides of the longitudinal axis thereof cutting heads each including a cutting edge portion and an axially outwardly facing positioning shoulder portion which is unaffected by wear on the associated cutting edge, and means for progressively adjustably precisely positioning either end of the tool bit on the head piece wherein the exposed cutting edge of the tool bit projects a progressively varying distance laterally from the head piece, said means comprising a progressively adjustable locating member carried by the head piece and positioning to abut the positioning shoulder of the end of the tool bit opposite the one projecting from the head piece.

5. A boring bar assembly comprising: a boring bar having a shank portion removably mountable in a rotatable head of a machine for driving the boring bar assembly, and a head portion for carrying a boring tool bit, a boring tool bit projecting laterally from said head portion of the boring bar, the tool bit having at opposite ends and on opposite sides of the longitudinal axis thereof a pair of cutting heads each including a cutting edge portion and an axially outwardly facing positioning shoulder portion which is unaffected by wear on the associated cutting edge, whereby either end of the tool bit can be used as the cutting end thereof, and means for progressively adjustably precisely positioning either end of the tool bit on the head portion of the boring bar wherein the exposed cutting edge of the tool bit projects a progressively greater distance laterally from said head portion, said means comprising a progressively adjustable locating member carried by the head portion of the boring bar and positioned to abut the positioning shoulder of the inner end of the tool bit opposite the one projecting from the boring bar.

6. A boring bar assembly comprising: a boring bar having a shank portion removably mountable in a rotatable head of a machine for driving the boring bar assembly, and a head portion for carrying a boring tool bit, a boring tool bit projecting laterally from said head portion of the boring bar, the tool bit being of polygonal cross-section in a plane at right angles to the longitudinal axis of the tool bit and said head portion of the boring bar having a laterally extending socket of similar cross-section to the tool bit and into which the inner end of the tool bit extends, the tool bit being a short member having at opposite ends and on opposite sides of the longitudinal axis thereof a pair of cutting heads each including a cutting edge portion and an axially outwardly facing positioning shoulder portion which is unaffected by wear on the associated cutting edge, whereby either end of the tool bit can be used as the cutting end thereof, and means for progressively adjustably precisely positioning either end of the tool bit on the head portion of the boring bar wherein in exposed cutting edge of the tool bit projects a progressively greatly distance laterally from said head portion, said means comprising a progressively adjustable locating member carried by the head portion of the boring bar and positioned to abut the positioning shoulder of the inner end of the tool bit opposite the one projecting from the boring bar.

References Cited
UNITED STATES PATENTS

| | | | |
|---|---|---|---|
| 552,065 | 12/1895 | King | 77—58 |
| 3,059,507 | 10/1962 | Hohl | 77—56 |
| 3,191,463 | 6/1965 | Ladenforf | 77—58 |

WILLIAM W. DYER, Jr., *Primary Examiner.*

GERALD A. DOST, *Assistant Examiner.*